US005681880A

United States Patent [19]

Désor et al.

[11] Patent Number: 5,681,880

[45] Date of Patent: Oct. 28, 1997

[54] AQUEOUS DISPERSIONS USEFUL FOR PRIMER COATINGS

[75] Inventors: Ulrich Désor, Idstein; Thomas Fichtner, Mommenheim, both of Germany

[73] Assignee: Hoechst Aktiengesellschaft, Frankfurt, Germany

[21] Appl. No.: 544,763

[22] Filed: Oct. 18, 1995

[30] Foreign Application Priority Data

Oct. 28, 1994 [DE] Germany .......................... 44 38 563.3

[51] Int. Cl.$^{6}$ .......................... C09D 125/14; C09D 7/12; C08K 3/26; C08K 3/10

[52] U.S. Cl. .......................... 524/320; 524/413; 428/464; 428/514; 427/393; 427/408

[58] Field of Search .......................... 524/413, 320; 428/464, 514; 427/408, 393

[56] References Cited

U.S. PATENT DOCUMENTS

| | | | |
|---|---|---|---|
| 3,852,087 | 12/1974 | Nordyke | 106/300 |
| 3,900,620 | 8/1975 | Gilman | 427/408 |
| 3,930,074 | 12/1975 | Drelich | 427/341 |
| 4,061,720 | 12/1977 | Phillips | 423/265 |
| 4,966,948 | 10/1990 | Godbey | 525/370 |
| 5,149,729 | 9/1992 | Englund | 524/366 |

FOREIGN PATENT DOCUMENTS

| | | | |
|---|---|---|---|
| 234779 | 10/1991 | Japan | 524/413 |
| 320565 | 12/1993 | Japan . | |

OTHER PUBLICATIONS

Hawley's Condensed Chemical Dictionary pp. 461, 1108 12th Edition.

*Primary Examiner*—David Buttner
*Attorney, Agent, or Firm*—Foley & Lardner

[57] ABSTRACT

Aqueous dispersions which comprise an emulsion polymer which is stable with respect to polyvalent zirconium ions, and a water-soluble zirconium compound, prevent the penetration of constituents from substrates which show a tendency to bleeding, and the dispersions are therefore suitable as a primer, especially for woods.

26 Claims, No Drawings

AQUEOUS DISPERSIONS USEFUL FOR PRIMER COATINGS

BACKGROUND OF THE INVENTION

1. Field of the Invention

The present invention relates to an aqueous dispersion, to its preparation, and to its use, for example, for primer coatings for wood and for other substrates which show a tendency toward bleeding.

2. Description of Related Art

It is known that constituents of wood such as tannin and lignin which are present, for example, in relatively large quantities in woods such as red cedar, framiré, merbau and others, especially under the effect of moisture, lead to staining, especially when such woods are coated with aqueous topcoats. Staining also occurs, for example, with MDF wood fiber boards (chip wood panel) and gypsum plasterboards which contain tannin-like substances which have a tendency to discolor aqueous coatings, and also with surfaces contaminated with tar/nicotine.

In order to prevent this unwanted phenomenon, primers are applied first before the topcoat is applied. Up to now, the binders which have been successfully used for such primers have been, for example, two-component systems based on polyurethanes and epoxy resins, based on alkyd resins dissolved in solvent, or based on copolymers dissolved in solvents. Disadvantages of these coating systems are the relatively long through-drying time and the solvent content.

Primers for surface coating, comprising synthetic resins and organometallic compounds dissolved in organic solvents, are known from EP-A 0 420 293. Because of their solvent component, the primers are unsuitable for large-area use in interiors, and are therefore employed exclusively in the adhesives sector.

U.S. Pat. No. 3,847,857 discloses aqueous coatings which are intended to prevent the staining of coatings on wood. These coatings are based on water-dilutable vinyl polymers which contain amino groups or quaternary ammonium groups, to which compounds containing polyvalent metal ions, for example, chromium, tungsten, boron, and molybdenum ions, can be added. Disadvantages of these products are the poor weathering stability and the toxicity of the added metal compounds.

By adding calcium-barium-phosphorus silicate pigments or aluminum-zirconium-phosphorus silicate pigments, it is possible to improve the action of primers with respect to wood constituents ("New latex with moisture vapor barrier, alkali resistance and tannin block properties", Dow Chemical Company, Water-borne, Higher Solids Coatings Symposium, Feb. 1–3, 1989, New Orleans, USA and "Tannin stain inhibition with Halox Pigments", brochure from Halox Pigments, Hammond, Ind., USA). The results obtained, however, depend heavily on the particular formulation.

EP-A-0,192,077 mentions primers which are based on aqueous vinyl polymer dispersions, stable to polyvalent ions, and which comprise a water-soluble polymeric zinc amine complex. Disadvantages of these primers are the high pH, the unpleasant odor of ammonia, and the apparent restriction to the formulation only of primers which are suitable for wood.

SUMMARY OF THE INVENTION

The object of the present invention was therefore to provide an aqueous primer which gives resistant and weatherfast films on different substrates and prevents the bleeding, from the particular substrate, of substances present therein.

It is also an object of the invention to provide methods of making and using such primers.

These objects has been achieved in accordance with the present invention by providing an aqueous formulation based on a polymer dispersion to which a water-soluble zirconium compound has been added.

The present invention therefore provides an aqueous dispersion for primers, comprising an emulsion polymer which is stable with respect to polyvalent zirconium ions, and a water-soluble zirconium compound.

In accordance with other aspects of the invention, there has been provided a primer coating including an aqueous dispersion as described above.

In accordance with another aspect of the invention, there is provided a substrate, such as wood, coated with such a primer composition.

Further objects, features and advantages of the invention will become apparent from the detailed description of preferred embodiments that follows.

DETAILED DESCRIPTION OF THE PREFERRED EMBODIMENTS

Suitable emulsion polymers for use in the aqueous dispersion of the invention are all known polymers, such as homo- and/or copolymers, which are obtainable in dispersion form and which possess adequate stability in the presence of polyvalent zirconium ions. Mixtures of any desired polymer are also useful.

Particularly, suitable emulsion polymers preferably contain from 99.7 to 70% by weight, based on the overall quantity of monomers, of free-radically polymerizable, olefinically unsaturated compounds from the group of the acrylic and methacrylic esters of $C_1$–$C_{12}$ monoalcohols, preferably $C_1$–$C_8$ monoalcohols, for example, methanol, ethanol, isopropanol, isobutanol, n-butanol and 2-ethylhexyl alcohol; of aromatic vinyl monomers, for example, styrene and vinyltoluene; of vinyl esters of $C_1$–$C_{12}$ alkanemonocarboxylic acids, for example, vinyl acetate, vinyl propionate, vinyl n-butyrate, vinyl laurate, VeoVa® 9 and VeoVa® 10 (Shell Chemie, vinyl esters of $\alpha,\alpha$-dialkyl-branched monocarboxylic acids); of vinyl halides, for example, vinyl chloride and vinylidene chloride; of $\alpha,\beta$-monoolefinically unsaturated nitriles, for example, acrylonitrile and methacrylonitrile; and of alkyl esters of monoolefinically unsaturated dicarboxylic acids, for example, di-n-butyl maleate and the corresponding fumarate.

The polymers preferably contain, in addition, from 0.3 to 10% by weight, in particular from 0.5 to 5% by weight, based on the overall quantity of monomers, of $\alpha,\beta$-monoolefinically unsaturated mono- and/or dicarboxylic acids, for example, acrylic acid, methacrylic acid, itaconic acid, maleic acid and fumaric acid, and their amides or N-substituted amides, for example, acrylamide, methacrylamide, N-methylolacrylamide, and N-butoxymethacrylamide.

It is also useful for from 0 to 20% by weight, preferably 0.5 to 5 % by weight, based on the overall quantity of monomers, of functional monomers to be present in the copolymers, examples including hydroxyl-containing monomers such as hydroxyalkyl acrylates and hydroxyalkyl methacrylates, especially hydroxyethyl methacrylate and hydroxypropyl methacrylate; and/or acetylacetoxy-containing monomers which improve the wet adhesion, especially allyl acetoacetate, acetylacetoxyethyl methacrylate and acetylacetoxybutyl methacrylate, and/or crosslinking monomers, such as epoxide-containing monomers and those containing silane groups, especially glycidyl acrylate, glycidyl methacrylate, vinyl-trimethoxysilane and γ-methacryloyloxypropyltrimethoxysilane; and/or nitrogen-containing monomers, for example, chosen from the group of polymerizable monomers containing an amino, ureido or N-heterocyclic group, for example, dimethylaminoethyl acrylate and methacrylate, N-(2-methacryloylethyl) ethyleneurea; and/or keto-containing monomers, for example, diacetoneacrylamide, diacetonemethacrylamide, acrolein and 2-butanone methacrylate.

In autocrosslinking dispersions it is useful for keto-containing polymers also to contain up to 5% by weight, based on the overall quantity of monomers, of a di- or polyfunctional carboxylic hydrazide, for example, adipic dihydrazide.

By combining "hard" monomers such as methyl methacrylate and styrene with "soft" monomers such as butyl acrylate and ethylhexyl acrylate in a manner known to the person skilled in the art, it is possible to adjust the minimum film-forming temperature (MFT) of the dispersion, preferably such that it is in the range from 0° to 50° C., in particular from 0° to 30° C.

The dispersions normally have a solids content in the range from 30 to 65% by weight, preferably from 40 to 50% by weight. The average particle diameter of the emulsion polymers is preferably from 0.02 to 1 μm, in particular from 0.04 to 0.8 μm.

The dispersion may also include the usual emulsifiers. Any desired emulsifier or mixture of emulsifiers may be used. Generally, the dispersions should not, based on the content of polymer, substantially exceed the commonly used quantities of preferably up to 3%, in particular up to 2%, by weight of ionic emulsifiers and/or preferably up to 6%, in particular up to 4%, by weight of nonionic emulsifiers, in each case based on the weight of the dispersion.

Examples of useful nonionic emulsifiers include alkyl polyglycol ethers, such as ethoxylation products of lauryl, oleyl or stearyl alcohol, or of mixtures such as coconut fatty alcohol, alkylphenol polyglycol ethers, preferably ethoxylation products of octyl- or nonylphenol, diisopropylphenol, triisopropylphenol or of di- or tri-tert-butylphenol, or ethoxylation products of polypropylene oxide.

Among ionic emulsifiers, those primarily suitable include anionic emulsifiers. These may be the alkali metal salts or ammonium salts of alkyl-, aryl- or alkylarylsulfonates or -phosphonates or alkyl, aryl or alkylaryl sulfates or phosphates, or compounds with other anionic end groups, which may also contain oligo- or polyethylene oxide units between the hydrocarbon radical and the anionic group. Typical examples are sodium lauryl sulfate, sodium octylphenol glycol ether sulfate, sodium dodecylbenzenesulfonate, sodium lauryl diglycol sulfate, ammonium tri-tert-butylphenol pentaglycol sulfate or -octaglycol sulfate.

Protective colloids optionally present in the dispersion may include any desired used in effective amounts. In particular, the colloids may be natural substances, for example, gum arabic, starch, alginates, or modified natural substances, for example, methylcellulose, ethylcellulose, hydroxyalkylcellulose or carboxymethylcellulose, or synthetic polymers, for example, polyvinyl alcohol, polyvinylpyrrolidone, or mixtures of such substances. Preferably, it is possible for modified cellulose derivatives and synthetic protective colloids to be present in quantities of from 0.001 to 1% by weight, based on the dispersion. Compatibility should be checked in each individual case.

Aqueous dispersions which are stable with respect to polyvalent zirconium ions are commercially available, examples including Mowilith® DM 611 (styrene/acrylate copolymer, Hoechst) and VDM 7410 (styrene/acrylate copolymer, Hoechst).

In accordance with the invention, the dispersions for primers contain zirconium compounds. Suitable zirconium compounds include water-soluble salts or water-soluble complex compounds of zirconium. Any such compound or mixture of compounds may be used. Examples include ammonium zirconium carbonate, zirconium acetoacetate, zirconium hydroxychloride, zirconium nitrate, zirconium oxychloride, zirconium orthosulfate, zirconium acetate, sodium zirconium sulfate, zirconium propionate, and potassium zirconium phosphate.

The water-soluble zirconium compounds are preferably employed in the form of an aqueous solution of an ammonium zirconium carbonate complex, and with particular preference in the form of a 20% strength (calculated as zirconium oxide ($ZrO_2$)) aqueous solution of an ammonium zirconium carbonate complex stabilized by chelating agents, for example ammonium tartrate. Water-soluble zirconium compounds of this kind are commercially available, for example, under the name Bacote® 20 (MEL Chemicals).

The dispersions according to the invention preferably contain from 0.2 to 20% by weight, in particular from 0.5 to 10% by weight and with particular preference from 1 to 5% by weight, of zirconium compounds (calculated as zirconium oxide ($ZrO_2$)), based on the aqueous dispersion.

The present invention additionally provides a process for the preparation of an aqueous dispersion for primers. Any desired process can be used.

Generally, in the present invention, the aqueous dispersion of an emulsion polymer which is stable with respect to polyvalent zirconium ions is mixed with a water-soluble zirconium compound. The zirconium compound can be added as a solid or can be dissolved beforehand in water and then metered in as an aqueous solution. If the aqueous dispersion is not sufficiently stable, enhanced stability with respect to polyvalent ions can be obtained by the supplementary addition of, for example, from 0.1 to 5% by weight, preferably from 0.5 to 1% by weight, based on the polymer, of conventional ionic and/or nonionic emulsifiers.

The emulsion polymers employed are prepared by any conventional polymerization methods, such as batch methods, metering methods, and two-step or multistep emulsion polymerization techniques.

In order to initiate and continue polymerization, use may be made of oil- and/or, preferably, water-soluble free-radical initiators or redox systems. Suitable examples include hydrogen peroxide, potassium or ammonium peroxodisulfate, dibenzoyl peroxide, lauryl peroxide, tri-tert-butyl peroxide, azobisisobutyronitrile, alone or together with reducing components, for example, sodium bisulfite, Rongalit® (formaldehyde-sodium sulfoxylate, BASF AG), glucose, ascorbic acid and other compounds having a reducing action.

It is also useful to employ regulators, for example, mercaptans, and other conventional auxiliaries which are known to the person skilled in the art for emulsion polymerization.

In addition to the zirconium compounds, the primers according to the invention may contain from 0.1 to 10% by weight, preferably from 0.2 to 4% by weight, based on the aqueous dispersion, of further water-soluble metal compounds, preferably zinc compounds and, in particular, the zinc compounds described in EP-A-0 192 077, which is hereby incorporated by reference.

In addition to the zirconium compounds and the binders, the aqueous dispersions according to the invention may also include conventional film-forming auxiliaries in the usual amounts, for example, glycol ether esters or benzine, generally in amounts of up to 5% by weight, and also pigments and/or fillers in useful amounts, for example, titanium dioxide, talc, calcite, dolomite, and thickeners, dispersants and wetting agents, preservatives and defoamers. The pigment volume concentration (p.v.c.) of the primer in this context is preferably <40%.

The primers according to the invention are low in solvent and nontoxic and have a good barrier effect against stain-forming wood constituents or similar compounds.

The present invention additionally provides for the use of the aqueous dispersion for primers in the treatment of substrates which show a tendency toward bleeding, preferably wood, and especially woods which have a high tannin content, such as those of the type red cedar, framiré and merbau.

The invention is illustrated by the following non-limiting examples. The parts and percentages indicated in the examples below relate to weight, unless otherwise stated.

EXAMPLE 1

Preparation of the Binder 90 to 99 parts of a commercial aqueous copolymer dispersion, for example, Mowilith DM 611 or Mowilith VDM 7410, are mixed with from 0.5 to 10 parts of an ammonium zirconium carbonate complex (calculated as $ZrO_2$), stabilized with ammonium tartrate. Using these components it is generally possible to prepare mixtures of adequate storage stability at room temperature. With the chosen quantity of ammonium zirconium carbonate complex, dispersions having only a relatively low ammoniacal odor are obtained.

EXAMPLE 2

Preparation of Primers

To produce primers, a modified dispersion of Example 1 is mixed with a pigment paste.

Primer Based on a Styrene/Acrylate Dispersion

A pigment paste is first of all prepared from:

181.0 parts of water, 2.0 parts of preservative (Mergal® K9N, Riedel-de H äen), 2.0 parts of sodium polyacrylate, 30% strength aqueous solution (Lopon® 890, BK-Ladenburg), 1.0 part of sodium polyphosphonate (Lopon® WN, BK-Ladenburg), 75.0 parts of titanium dioxide, rutil (Kronos® 2059, Kronos Titan), 3.0 parts of polyurethane thickener (Borchigel® LW 44, Gebr. Borchers), 3.0 parts of defoamer (Additol® VXW 6203, Vianova Kunstharz), 18.0 parts of solvent (Texanol® (aliphatic esters), Eastman), and 150.0 parts of calcium carbonate (5 μm) (Omyacarb® 5 GU, Omya).

The individual components are mixed with thorough stirring and then dispersed in a dissolver for about 15 minutes.

A styrene/acrylate dispersion is modified with the ammonium zirconium carbonate complex by mixing:

15.0 parts of ammonium zirconium carbonate complex stabilized with ammonium tartrate (Bacote 20, MEL Chemicals), 550.0 parts of a commercial styrene/acrylate dispersion (Mowilith DM 611).

The modified dispersion is intimately mixed with the pigment paste. 1 kg of a primer is obtained.

COMPARISON EXAMPLE 2

A primer is prepared in accordance with Example 2 but with the difference that no zirconium compound is added.

Performance Testing

EXAMPLE 3

A dispersion according to Example 1 which forms a film at room temperature, and therefore has a sufficiently low minimum film-forming temperature, is applied in undiluted form or diluted with about 10% of water to woods, for example, framiré or red cedar wood. After these coatings have dried (usually with a waiting time of about 4 hours), they are coated over with a commercial aqueous emulsion coating material.

Dispersions which include the addition of the ammonium zirconium carbonate complex exhibit a distinct barrier-effect with respect to the penetration of the constituent substances (see Table 1).

COMPARISON EXAMPLE 3

Analogous to Example 3, a dispersion is used but without the addition of zirconium compounds. Penetration of the constituent substances from the substrate cannot be effectively prevented (see Table 1).

EXAMPLE 4

A primer according to Example 2 is employed for a one-coat application (about 120 $g/m^2$) to, for example, framiré or red cedar wood. After drying for at least 4 hours the substrate is recoated with one or two coats of a commercial emulsion coating material based, for example, on styrene copolymer dispersions (pvc about 18%). After the topcoat has been dried for 24 hours, the sections of wood are placed in a tub with the coated side downward on absorbent Cloths saturated with water. A further possibility in the test is to leave the wooden sections "floating" in a water bath with the coated side downward. In this context it is important that the edge zones of the wooden sections are likewise coated with the primer and the emulsion paint, so as to prevent bleeding from the edge of the wooden sections.

The staining is assessed after the wooden sections have been removed from the tub or from the water bath, after a storage period of 24 hours, by evaluating the discoloration of the topcoat layer. The penetration of constituents from the wood can be effectively prevented (see Table 1).

COMPARISON EXAMPLE 4

Example 4 is repeated with a primer according to Comparison Example 2. It is not possible effectively to prevent penetration of constituents from the wood (see Table 1).

EXAMPLE 5

A primer similar to that of Example 2 is tested on gypsum plasterboards as substrates. For this purpose about 120 g/m$^2$ of the primer of Example 2 are applied to a commercial gypsum plasterboard. After the primer has dried for at least 4 hours, a gypsum plaster is applied in the coating thickness conventional in practice. After the gypsum plaster has been dried for 24 hours, a qualitative assessment is made of the discoloration. The penetration of constituents from the gypsum plasterboards can be effectively prevented.

COMPARISON EXAMPLE 5

Example 5 is repeated with the primer according to Comparison Example 2. The penetration of constituents from the gypsum plasterboards cannot be completely prevented (see Table 1).

EXAMPLE 6

Testing is also carried out of a primer similar to that of Example 2 in respect of its barrier effect to nicotine and tar components. For this purpose, the primer is applied to a polystyrene foam slab which is usually used for the paneling of ceilings. The slab comes from a ceiling structure in a restaurant where heavy smoking takes place. The ceiling slab carries a brown-yellow discoloration owing to nicotine and/or tar components. About 120 g/m$^2$ of the primer are applied to this slab, which is dried for at least 4 hours and then recoated with a commercial emulsion paint. Here, too, a good barrier action is evident with respect to the tar components (see Table 1).

COMPARISON EXAMPLE 6

Example 6 is repeated with the primer according to Comparison Example 2. The penetration of tar components cannot be effectively prevented (see Table 1).

EXAMPLE 7

A primer similar to that of Example 2 is applied in a quantity of about 120 g/m$^2$ to a chipboard panel of type V 20 or V 100 (from Innotec, for example). After drying for at least 4 hours the panel is likewise recoated with a commercial emulsion paint. The adequate barrier effect can be seen after the topcoat has dried (see Table 1).

COMPARISON EXAMPLE 7

Example 7 is repeated with the primer according to Comparison Example 2. The penetration of constituents from the chipboard panel cannot be effectively prevented (see Table 1).

COMPARISON EXAMPLE A

The substrate materials coated in Examples 3 to 7 are provided directly, without a primer, with the topcoat employed in the Examples. Severe penetration of constituents from the substrate is observed (see Table 1).

TABLE 1

| | Performance Testing | | | | | | |
|---|---|---|---|---|---|---|---|
| | Woods[1)] | | | | | Slab with tar/ | |
| | Red cedar | | Framiré | | Gypsum | nicotine | Chipboard panel[2)] |
| Primer/Binder | Wet | Dry | Wet | Dry | plasterboard[3)] | components[2)] | Type V 20/V 100 |
| Example 3 | 1 | 1 | 1 | 1 | 1 | 1–2 | 1 |
| Comparison Ex. 3 (without Zr complex) | 1–2 | 3 | 3 | 3 | 2 | 3 | 2 |
| Example 4 | 1 | 1 | 1–2 | 1–2 | — | — | — |
| Comparison Ex. 4 (without Zr complex) | 1–2 | 3 | 2 | 2 | — | — | — |
| Example 5 | — | — | — | — | 1 | — | — |
| Comparison Ex. 5 (without Zr complex) | — | — | — | — | 1–2 | — | — |
| Example 6 | — | — | — | — | — | 1 | — |
| Comparison Ex. 6 (without Zr complex) | — | — | — | — | — | 3 | — |
| Example 7 | — | — | — | — | — | — | 2 |
| Comparison Ex. 7 (without Zr complex) | — | — | — | — | — | — | 2–3 |
| Comparison Ex. A (without primer) | 3 | 4 | 5 | 5 | 4 | 5 | 3 |

Notes:
1)Topcoat: emulsion coating material
2)Topcoat: emulsion paint
3)Topcoat: gypsum plaster
1: easily recognizable, no bleeding and/or no discoloration
5: severe bleeeding through coating films and/or disoloration of coating films Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. An aqueous dispersion consisting essentially of an emulsion polymer, wherein the emulsion polymer comprises a styrene/(meth)acrylate copolymer comprising from 70 to 99.7% by weight of one or more styrene and compounds selected from the group consisting of the acrylates and methacrylates of $C_1$–$C_{12}$ monoalcohols, from 0.3 to 10% by weight of compounds selected from the group consisting of α,β-monoolefinically unsaturated mono- and dicarboxylic acids, amides thereof, and N-substituted amides thereof, and from 0 to 20% by weight of compounds selected from the group consisting of hydroxyl-containing monomers, acetylacetoxy-containing monomers, epoxide-containing monomers, monomers containing silane groups, nitrogen-containing monomers, and keto-containing monomers, the percent by weight in each case based on the total weight of compounds used to form the polymer;

0.1 to 5% by weight based on the total weight of said emulsion polymer, of an emulsifier which is capable of enhancing the stability of said emulsion polymer with respect to polyvalent zirconium ions;

a water-soluble zirconium compound selected from the group consisting of ammonium zirconium carbonate, zirconium acetoacetate, zirconium acetate, sodium zirconium sulfate, zirconium propionate and potassium zirconium phosphate;

optionally, a zinc compound;

optionally, a chelating agent; and optionally, one or more additives selected from the group consisting of film-forming auxiliaries, pigments, fillers, thickeners, dispersants, wetting agents, preservatives, and defoamers.

2. An aqueous dispersion as claimed in claim 1, wherein the zirconium compound is present in a quantity of from 0.2 to 20% by weight, calculated as $ZrO_2$, based on the weight of the dispersion.

3. An aqueous dispersion as claimed in claim 1, wherein the zirconium compound comprises an ammonium zirconium carbonate complex.

4. An aqueous dispersion as claimed in claim 1, wherein said zinc compound is present in a quantity of from 0.1 to 10% by weight, based on the weight of the dispersion.

5. An aqueous dispersion of claim 1, wherein said zirconium compound is present as $ZrO_2$ in an amount from 1 to 5% by weight based on the weight of said polymer.

6. An aqueous dispersion as claimed in claim 1, wherein the emulsion polymer has a minimum film-forming temperature of from 0° to 50° C.

7. An aqueous dispersion as claimed in claim 1, wherein one or more of said additives selected from the group consisting of film-forming auxiliaries, pigments, fillers, thickeners, dispersants, wetting agents, preservatives, and defoamers are present.

8. A process for the preparation of an aqueous dispersion as claimed in claim 1, comprising mixing the emulsion polymer with the water-soluble zirconium compound and said emulsifier and optionally with one or more additives selected from the group consisting of film-forming auxiliaries, pigments, fillers, thickeners, dispersants, wetting agents, preservatives and defoamers, said emulsifier being present in an amount from 0.1 to 5% by weight based on the total weight of said emulsion polymer.

9. A process of claim 8, wherein said emulsifier is nonionic.

10. A process of claim 8, wherein said emulsifier is present in an amount from 0.5 to 1% by weight based on the weight of said polymer.

11. A process of claim 8, wherein said zirconium compound is present as $ZrO_2$ in an amount from 1 to 5% by weight based on the weight of said polymer.

12. An aqueous dispersion according to claim 1, wherein said aqueous dispersion consists of the emulsion polymer, 0.1 to 5% by weight based on the total weight of said emulsion polymer, of a nonionic emulsifier which is capable of enhancing the stability of said emulsion polymer with respect to polyvalent zirconium ions;

the water-soluble zirconium compound;

optionally, a chelating agent;

optionally, one or more additives selected from the group consisting of film-forming auxiliaries, pigments, fillers, thickeners, dispersants, wetting agents, preservatives, and defoamers.

13. A primer coating comprising an aqueous dispersion as claimed in claim 1.

14. A substrate coated with a coating as claimed in claim 13.

15. A substrate as claimed in claim 14, wherein the substrate before coating shows a tendency to bleeding.

16. A substrate as claimed in claim 14, wherein the primer coating is overcoated with another coating.

17. Wood coated with an aqueous dispersion as claimed in claim 1.

18. An aqueous dispersion as claimed in claim 1, which comprises ammonium tartrate as chelating agent.

19. An aqueous dispersion as claimed in claim 1, wherein the emulsion polymer comprises an acrylic polymer.

20. An aqueous dispersion as claimed in claim 1, which has a solids content of from 30 to 65% weight, and wherein the average particle diameter of the emulsion polymer is 0.02 to 1 μm, and which is substantially free of organic solvent.

21. A method of coating a substrate comprising coating a dispersion as claimed in claim 1 onto the substrate and coating a second coating onto the previously applied coating.

22. An aqueous dispersion of claim 1, wherein said emulsifier is nonionic.

23. An aqueous dispersion of claim 1, wherein said emulsifier is present in an amount from 0.5 to 1% by weight based on the weight of said polymer.

24. An aqueous dispersion consisting essentially of an emulsion polymer, wherein the emulsion polymer comprises a styrene/(meth)acrylate copolymer comprising from 70 to 99.7% by weight of styrene and compounds selected from the group consisting of the acrylates and methacrylates of $C_1$–$C_{12}$ monoalcohols, from 0.3 to 10% by weight of compounds selected from the group consisting of α,β-monoolefinically unsaturated mono- and dicarboxylic acids, amides thereof, and substituted amides thereof, and from 0 to 20% by weight of compounds selected from the group consisting of hydroxyl-containing monomers, acetylacetoxy-containing monomers, epoxide-containing monomers, monomers containing silane groups, nitrogen-containing monomers, and keto-containing monomers, the percent by weight in each case based on the total weight of compounds used to form the polymer;

0.1 to 5% by weight based on the total weight of said emulsion polymer, of an emulsifier which is capable of enhancing the stability of said emulsion polymer with respect to polyvalent zirconium ions;

a chelating agent;

a water-soluble zirconium compound selected from the group consisting of ammonium zirconium carbonate, zirconium acetoacetate, zirconium acetate, sodium zirconium sulfate, zirconium propionate and potassium zirconium phosphate;

optionally, a zinc compound;

optionally, one or more additives selected from the group consisting of film-forming auxiliaries, pigments, fillers, thickeners, dispersants, wetting agents, preservatives, and defoamers;

and, optionally, one or more protective colloids, initiators, reducing components, and regulators.

25. An aqueous dispersion according to claim 24, wherein said chelating agent comprises ammonium tartrate.

26. A process for the preparation of an aqueous dispersion as claimed in claim 24, comprising mixing the emulsion polymer with the water-soluble zirconium compound and said emulsifier, and optionally with one or more additives selected from the group consisting of film-forming auxiliaries, pigments, fillers, thickeners, dispersants, wetting agents, preservatives and defoamers, said emulsifier being present in an amount from 0.1 to 5% by weight based on the total weight of said emulsion polymer.

* * * * *